United States Patent [19]

Maeda et al.

[11] 4,268,644
[45] May 19, 1981

[54] VULCANIZABLE RUBBER COMPOSITION

[75] Inventors: Akio Maeda; Kinro Hashimoto, both of Yokohama; Masaaki Inagami, Kamakura; Hiroshi Fukushima, Zushi, all of Japan

[73] Assignee: Nippon Zeon Co. Ltd., Tokyo, Japan

[21] Appl. No.: 927,620

[22] Filed: Jul. 24, 1978

[30] Foreign Application Priority Data

Jul. 29, 1977 [JP] Japan .................................. 52-91036
Jul. 29, 1977 [JP] Japan .................................. 52-91037

[51] Int. Cl.³ .............................................. C08L 71/02
[52] U.S. Cl. ...................................... 525/403; 525/404
[58] Field of Search ...................... 260/874; 528/392; 525/403, 404

[56] References Cited

U.S. PATENT DOCUMENTS

| | | | |
|---|---|---|---|
| 3,158,591 | 11/1964 | Vandenberg | 528/106 |
| 3,341,491 | 9/1967 | Robinson et al. | 528/373 |
| 3,787,376 | 1/1974 | Nakamura et al. | 528/375 |
| 3,876,590 | 4/1975 | Shimogawa et al. | 260/874 |
| 4,032,479 | 6/1977 | Bunnomori et al. | 260/874 |

*Primary Examiner*—Allan Lieberman
*Attorney, Agent, or Firm*—Sherman & Shalloway

[57] ABSTRACT

A vulcanizable rubber composition composed of 100 parts by weight of a terpolymer rubber (A) composed of 35 to 80 mole % of epichlorohydrin, 15 to 50 mole % of ethylene oxide and 5 to 15 mole % of an unsaturated epoxide, 0.2 to 10 parts by weight of a non-sulfur vulcanizing agent, and 0 to 10 parts by weight of a vulcanization aid. A vulcanized rubber prepared from this composition has superior sour gasoline resistance (softening resistance and resistance to embrittlement) and cold resistance. A rubber mixture (B) of an epichlorohydrin-ethylene oxide copolymer rubber and an epichlorohydrin-unsaturated epoxide copolymer rubber containing 35 to 80 mole % of epichlorohydrin, 15 to 50 mole % of ethylene oxide and 5 to 15 mole % of an unsaturated epoxide may be substituted for the terpolymer rubber (A).

15 Claims, No Drawings

VULCANIZABLE RUBBER COMPOSITION

This invention relates to a vulcanizable rubber composition to be used in applications involving contact with sour gasoline.

In recent years, control measures against automobile exhaust gases have been taken to meet the social need for improving the atmospheric environment, and efforts have been made to improve automobile engines. As a result, a number of important safety parts made of synthetic rubbers which meet the requirement of thermal stability, gasoline (or oil) resistance and cold resistance at the same time have been mounted on automobiles. Among the existing synthetic rubbers, an epichlorohydrin-ethylene oxide copolymer rubber (sometimes to be referred to as CHC hereinbelow) has a particularly well balanced combination of these properties and therefore, has found extensive use as hoses, gaskets, O-rings and oil seals.

On the other hand, as a result of engine improvement, the ambient atmosphere of an engine tends to be at a higher temperature than heretofore. This renders gasoline susceptible to oxidation and results in the formation of sour gasoline. The sour gasoline is caused by the oxidation of highly unsaturated ingredients of gasoline to peroxides by oxygen in the air, which peroxides further undergo oxidation to aldehyde compounds or carboxylic acids. Recognizing the serious effect of sour gasoline, General Motors Corporation already established a testing method [GM OP-9308 (1966)] to exert a proper control over it.

CHC has superior gasoline resistance, but on contact with sour gasoline, is easily softened and dissolved. Thus, automotive parts made of CHC cannot retain their shape, and therefore, it may possible lead to a serious accident. This phenomenon is ascribable to the fact that the peroxides in the sour gasoline attack the ether linkage that forms the main chain of CHC, and induces the breakage of the main chain of CHC. [The breakdown of the ether linkage by auto-oxidation is described in detail in Angew. Markromol. Chem. 16/17, 103, (1971).]

One conceivable method for removing the aforesaid defect of CHC is to blend CHC with an acrylonitrile/-butadiene copolymer rubber or an acrylic rubber. The blend of CHC with the acrylonitrile-butadiene copolymer rubber apparently does not soften nor dissolve on contact with sour gasoline. However, because of the poor compatibility between the two components and the markedly low break elongation, this blended rubber cannot endure practical application. The blend of CHC and acrylic rubber cannot be prevented from softening and dissolving by sour gasoline because the acrylic rubber essentially has poor resistance to gasoline.

It is an object of this invention therefore to provide a vulcanizable rubber composition which can be free from softening and dissolving by sour gasoline without sacrificing the thermal stability, gasoline (or oil) resistance and cold resistance of CHC, and thus can be used in applications involving contact with sour gasoline.

According to this invention, this object can be achieved by a vulcanizable rubber composition comprising (1) 100 parts by weight of a rubber selected from the group consisting of (A) a terpolymer rubber composed of 35 to 80 mole % of epichlorohydrin, 15 to 50 mole % of ethylene oxide and 5 to 15 mole % of an unsaturated epoxide, and (B) a rubber mixture prepared by mixing an epichlorohydrin-ethylene oxide copolymer rubber with an epichlorohydrin-unsaturated epoxide copolymer rubber so that the mixture will contain 35 to 80 mole % of epichlorohydrin, 15 to 50 mole % of ethylene oxide and 5 to 15 mole % of an unsaturated epoxide;

(2) 0.2 to 10 parts by weight of a non-sulfur vulcanizing agent; and (3) 0 to 10 parts by weight of a vulcanization aid.

One characteristic feature of the present invention is the use of an unsaturated epoxide as a comonomer constituting the terpolymer rubber (A) or the rubber mixture (B), and a non-sulfur vulcanizing agent which does not cause the unsaturated bond of the unsaturated epoxide to be involved in vulcanization. A vulcanized rubber prepared from the composition of this invention possess the unsaturated bond of the unsaturated epoxide as a result of being vulcanized with the non-sulfur vulcanizing agent. Accordingly, even if the peroxide in sour gasoline causes the breakage of the ether linkage of the main chain of the vulcanized rubber, the peroxide simultaneously reacts with the unsaturated bond of the unsaturated epoxide in the vulcanized rubber to induce vulcanization, and therefore, the softening and dissolving of the vulcanized rubber is prevented.

The terpolymer rubber (A) should be composed of 35 to 80 mole % (preferably 48 to 74 mole %) of epichlorohydrin, 15 to 50 mole % (preferably 20 to 40 mole %) of ethylene oxide and 5 to 15 mole % (preferably 6 to 12 mole %) of an unsaturated epoxide. The rubber mixture (B) is obtained by mixing an epichlorohydrin-ethylene oxide copolymer rubber with an epichlorohydrin-unsaturated epoxide copolymer rubber so that the resulting mixture may contain 35 to 80 mole % (preferably 48 to 74 mole %) of epichlorohydrin, 15 to 50 mole % (preferably 20 to 40 mole %) of ethylene oxide and 5 to 15 mole % (preferably 6 to 12 mole %) of an unsaturated epoxide. In either the terpolymer rubber (A) or the rubber mixture (B), if the content of ethylene oxide is less than 15 mole %, the gasoline (oil) resistance is degraded. If the content of the unsaturated epoxide is less than 5 mole %, no effect of preventing softening of the vulcanized rubber in sour gasoline is obtained, and if it exceeds 15 mole %, hardening deterioration is caused by the effect of sour gasoline, and the vulcanized rubber loses rubbery elasticity and becomes brittle.

The epichlorohydrin-ethylene oxide copolymer rubber used as one component of the rubber mixture (B) is preferably obtained by copolymerizing 30 to 70 mole % of epichlorohydrin with 70 to 30 mole % ethylene oxide. Such a rubber is sold under the trademark Hydrin 200 and Herclor C by B. F. Goodrich Chemical Co. and Hercules Incorporated, respectively. As the epichlorohydrin-unsaturated epoxide copolymer, the other component of the rubber mixture (B), a copolymer composed of 80 to 90 mole % of epichlorohydrin and 20 to 10 mole % of an unsaturated epoxide is preferred.

Examples of the unsaturated epoxide are allyl glycidyl ether, glycidyl methacrylate, glycidyl acrylate and butadiene monooxide.

The terpolymer rubber (A), the epichlorohydrin-ethylene oxide copolymer rubber and the epichlorohydrin-unsaturated epoxide copolymer rubber can be prepared in accordance with ordinary solution-polymerization recipes. All of them preferably have a Mooney viscosity [$ML_{1+4}(100°\ C.)$] of 10 to 150.

When a rubber having an unsaturated epoxide as a copolymer component is to be vulcanized, a sulfur-type vulcanizing agent is usually employed to induce crosslinking by utilizing its unsaturated bond. However, when a sulfur-type vulcanizing agent is used to vulcanize the rubber composition of this invention, the vulcanized rubber has a decreased content of the unsaturated bond and a poor resistance to sour gasoline, and the object of this invention cannot be achieved. It is necessary therefore to use a non-sulfur vulcanizing agent, that is a vulcanizing agent of the type which induces a vulcanization reaction through a chlorine atom, in order to leave the unsaturated bond of the unsaturated epoxide in the vulcanized rubber. Vulcanizing agents of this type are generally used for the vulcanization of saturated epichlorohydrin rubbers, and typical examples include (1) a vulcanizing agent selected from 2-mercaptoimidazolines and 2-mercaptopyrimidines, and (2) a vulcanizing agent selected from trithiocyanuric acid and its derivatives (U.S. Pat. No. 3,787,376). When the vulcanizing agent (1) is used, a metal compound selected from the aromatic carboxylic acid salts, saturated aliphatic carboxylic acid salts, carbonates, phosphites, silicates and oxides of metals of Groups IIA, IIB and IVA of the periodic table is usually employed as a vulcanization aid (U.S. Pat. No. 3,341,491). In the case of using the vulcanizing agent (2), too, the use of the above metal compounds as a vulcanization aid is preferred. Especially preferred vulcanizing agent systems include a combination of 2-mercaptoimidazoline and red lead, a combination of trithiocyanuric acid and magnesium oxide, and a combination of trithiocyanuric acid, magnesium oxide and calcium carbonate. The amount of the vulcanizing agent is 0.2 to 10 parts by weight, preferably 0.5 to 3 parts by weight, per 100 parts by weight of the terpolymer (A) or the rubber mixture (B). The amount of the metal compound as vulcanization aid is up to 10 parts by weight, preferably 2 to 7 parts by weight on the same basis.

The rubber composition of this invention is prepared by mixing the terpolymer (A) composed of epichlorohydrin, ethylene oxide and unsaturated epoxide or the rubber mixture (B) composed of the epichlorohydrin-ethylene oxide copolymer rubber and the epichlorohydrin-unsaturated epoxide copolymer rubber with the sulfur-free vulcanizing agent and ordinary rubber compounding agents such as a vulcanization aid, a reinforcing agent, a filler, a plasticizer or an antioxidant by an ordinary mixer such as a roll mill or a Banbury mixer.

Heating the rubber composition at 120° to 200° C. for 5 to 120 minutes gives a rubber vulcanizate having superior resistance to sour gasoline.

To improve the properties, especially compression set, of this vulcanizate, it is preferably heat-treated at 100° to 180° C. for 1 to 24 hours. The resulting vulcanizate is suitably used in applications involving contact with sour gasolines, for example in fuel system hoses, diaphragms and packings attached to internal combustion engines of automobiles, air planes, agricultural machinery, and the like.

The following Examples are given to illustrate the present invention more specifically.

The sour gasoline resistance and cold resistance in these examples were measured by the following methods.

Resistance to sour gasoline (1) Resistance to softening

A sour gasoline having a peroxide value (measured by UOP Testing Method 33–59 of Universal Oil Products Company) of 6.1 gram-equivalents/1000 liters was prepared by exposing "Nisseki High Arom 2S" (a commercially available standard test gasoline) intermittently to the irradiation of ultraviolet rays for 2 weeks.

A vulcanized rubber specimen, 15 mm in length, 10 mm in width and 0.5 mm in thickness, was dipped in the sour gasoline, and allowed to stand for 240 hours in an atmosphere at 60° C. Immediately then, the pencil scratch value of the surface of the specimen was measured by a method substantially in accordance with the pencil scratch test method of ASTM D 3363. The resulting values were rated on a scale of A, B, C and D. Specimens having softening resistance with ratings of A and B were regarded as acceptable. The ratings of the pencil scratch values are shown in Table 1.

TABLE 1

| Rating | Pencil scratch value | Surface condition of the vulcanizate |
|---|---|---|
| D | 5B–6B | The surface is markedly softened, and susceptible to disintegration |
| C | B–4B | The surface is softened, and is liable to be tacky. |
| B | 3H–HB | The surface is slightly softened, but no appreciable change is noted on the surface. |
| A | 4H or harder | No change occurs on the surface. |

(2) Resistance to embrittlement

A vulcanized rubber which has undergone hardening deterioration by sour gasoline is found to be acceptable by the softening resistance test, but cannot be used in practical application because it loses rubbery elasticity and is brittle. To check such a vulcanized rubber, vulcanized rubber specimens evaluated as ratings A and B in the above softening resistance test are bent by an angle of 180° immediately after the softening resistance test, and after standing in this state for 10 seconds, the specimens are observed for the occurrence of cracks at the bent area. The specimen in which cracks occur is judged to be inferior in resistance to embrittlement.

Cold resistance

In accordance with the low temperature impact embrittlement testing method of ASTM A 746, the breakage of a vulcanized rubber specimen at −35° C. was tested.

EXAMPLE 1

An epichlorohydrin-ethylene oxide-allyl glycidyl ether terpolymer rubber prepared by a known solution-polymerization method using an organoaluminum compound catalyst was mixed with compounding agents in accordance with the compounding recipe shown in Table 2 by a cold roll. The mixture was heated at 155° for 30 minutes under pressure, and heat-treated at 150° C. for 4 hours to afford a vulcanizate.

TABLE 2

| | |
|---|---|
| Epichlorohydrin-ethylene oxide-unsaturated epoxide terpolymer | 100 parts by weight |
| Stearic acid | 1 |
| FEF carbon black | 40 |
| Red lead | 7 |
| 2-Mercaptoimidazoline | 1.2 |
| Nickel dibutyldithiocarbamate | 1 |

TABLE 3

| | Run No. | | | | | |
|---|---|---|---|---|---|---|
| | 1 Comparison | 2 Comparison | 3 Invention | 4 Invention | 5 Invention | 6 Comparison |
| Terpolymer rubber composition (mole %) | | | | | | |
| Epichlorohydrin | 50 | 50 | 50 | 50 | 50 | 50 |
| Ethylene oxide | 50 | 47 | 45 | 40 | 35 | 30 |
| Allyl glycidyl ether | — | 3 | 5 | 10 | 15 | 20 |
| Sour gasoline resistance | | | | | | |
| (1) Softening resistance | D | C | B | A | A | A |
| (2) Resistance to embritlement | — | — | No crack | No crack | No crack | Crack occurred |
| Cold resistance | No breakage occured | | | | | |

It is seen from Table 3 that the epichlorohydrin-ethylene oxide copolymer rubber easily softens and disintegrates in sour gasoline, but a copolymer obtained by further copolymerizing allyl glycidyl ether shows superior resistance to sour gasoline. This effect is not obtained, however, if the ratio of the allyl glycidyl ether is less than 5 mole %. If its ratio is 20 mole %, the sour gasoline resistance is satisfactory, but the vulcanized rubber loses rubbery elasticity and develops crackings in the cold resistance test, thus failing to serve for practical purposes.

EXAMPLE 2

The same test as in Example 1 was performed using an epichlorohydrin-ethylene oxide-unsaturated epoxy terpolymer with a fixed proportion of the unsaturated epoxide. The results are shown in Table 4.

TABLE 4

| | Run No. | | | | | |
|---|---|---|---|---|---|---|
| | 7 Comparison | 8 Invention | 9 Invention | 10 Invention | 11 Invention | 12 Comparison |
| Terpolymer rubber composition (mole %) | | | | | | |
| Epichlorohydrin | 35 | 40 | 50 | 60 | 70 | 80 |
| Ethylene oxide | 55 | 50 | 40 | 30 | 20 | 10 |
| Allyl glycidyl ether | 10 | 10 | 10 | 10 | 10 | 10 |
| Sour gasoline resistance | | | | | | |
| (1) Softening resistance | D | B | A | A | A | A |
| (2) Resistance to embritlement | — | No crack | No crack | No crack | No crack | No crack |
| Cold resistance | No breakage occurred | | | | | Broken |

It is seen from Table 4 that the properties of the terpolymer rubber vary depending upon the proportion of ethylene oxide. In other words, when the proportion of ethylene oxide exceeds 50 mole %, the rubber has inferior resistance to gasoline (the pencil scratch hardness decreases extremely), and if it is less than 15 mole %, the rubber has poor cold resistance.

EXAMPLE 3

Each of epichlorohydrin-ethylene oxide-unsaturated epoxide terpolymers rubbers having the compositions shown in Table 5 was tested in the same way as in Example 1. The results are shown in Table 5.

TABLE 5

| | Run No. | | | | | |
|---|---|---|---|---|---|---|
| | 13 Comparison | 14 Comparison | 15 Invention | 16 Comparison | 17 Comparison | 18 Invention |
| Terpolymer rubber composition (mole %) | | | | | | |
| Epichlorohydrin | 30 | 25 | 45 | 85 | 75 | 80 |
| Ethylene oxide | 55 | 55 | 50 | 10 | 10 | 15 |
| Allyl glycidyl ether | 15 | 20 | 5 | 5 | 15 | 5 |
| Resistance to sour gasoline | | | | | | |
| (1) Softening resistance | D | D | B | A | A | A |
| (2) Resistance to embritlement | — | — | No cracking | No cracking | No cracking | No cracking |
| Cold resistance | No breakage | | | Broken | Broken | No breakage |

The results demonstrate that when the proportion of the ethylene oxide unit exceeds 50 mole %, the sour gasoline resistance of the terpolymer rubber cannot be improved even if the proportion of the unsaturated epoxide is increased. It is also clear from the results that when the proportion of the ethylene oxide unit is less than 15 mole %, increasing of the proportion of the unsaturated epoxide does not bring about an improvement in the cold resistance of the terpolymer rubber.

EXAMPLE 4

A vulcanizate of a terpolymer rubber composed of epichlorohydrin (60 mole %), ethylene oxide (34 mole %) and allyl glycidyl ether (6 mole %) was prepared in accordance with the compounding recipes shown in Table 6 and the same vulcanization conditions as in Example 1, and tested for sour gasoline resistance in the same way as in Example 1. The tensile test in a normal condition was carried out in accordance with JIS K-6301. The results are shown in Table 7.

TABLE 6

| Run No. | 19 | 20 | 21 | 22 |
|---|---|---|---|---|
| Terpolymer rubber | 100 | 100 | 100 | 100 |
| Stearic acid | 1 | 1 | 1 | 1 |
| FEF carbon black | 40 | 40 | 40 | 40 |
| Red lead | 7 | — | 5 | 5 |
| Magnesium oxide | — | 5 | — | — |
| 2-Mercaptoimidazoline | 1.2 | — | 0.3 | 0.3 |

TABLE 6-continued

| Run No. | 19 | 20 | 21 | 22 |
|---|---|---|---|---|
| Trithiocyanuric acid | — | 1.0 | — | — |
| Sulfur | — | — | 0.8 | 1.6 |
| 1,3-Diphenyl guanidine | — | — | 0.5 | 0.5 |
| Dibenzothiazyl disulfide | — | — | 1.5 | 1.5 |
| Nickel dibutyldithiocarbamate | 1 | 1 | 1 | 1 |

TABLE 7

| | Run No. | | | |
|---|---|---|---|---|
| | 19 | 20 | 21 | 22 |
| | Invention | | Comparison | |
| Tensile strength, kg/cm² | 173 | 138 | 167 | 159 |
| Elongation, % | 230 | 320 | 260 | 190 |
| Hardness, JIS | 67 | 69 | 68 | 72 |
| Sour gasoline resistance | | | | |
| (1) Softening resistance | A | A | D | D |
| (2) Resistance to embrittlement | No cracking | No cracking | — | — |

The results demonstrate that the vulcanizates obtained by vulcanization utilizing the chlorine atom of epichlorohydrin (i.e., the vulcanizate obtained by using 2-mercaptoimidazoline or trithiocyanuric acid as a vulcanizing agent) exhibited superior resistance to sour gasoline, but that the sulfur-vulcanized products obtained by vulcanization utilizing the unsaturated bond of allyl glycidyl ether had markedly poor sour gasoline resistance.

EXAMPLE 5

Example 1 was repeated except that a mixture of a copolymer rubber prepared from epichlorohydrin (90 mole %) and allyl glycidyl ether (10 mole %) by a known solution polymerization method using an organoaluminum compound catalyst with a copolymer rubber (CHC-1) composed of epichlorohydrin (50 mole %) and ethylene oxide (50 mole %) was used in accordance with each of the formulations shown in Table 8. The results are shown in Table 8.

TABLE 8

| | Run No. | | | | | |
|---|---|---|---|---|---|---|
| | 23 | 24 | 25 | 26 | 27 | 28 |
| | Comparison | Invention | | | | Comparison |
| Composition of the rubber mixture (mole %) | | | | | | |
| Epichlorohydrin | 50 | 66 | 70 | 74 | 78 | 82 |
| Ethylene oxide | 50 | 30 | 25 | 20 | 15 | 10 |
| Allyl glycidyl ether | 0 | 4 | 5 | 6 | 7 | 8 |
| Sour gasoline resistance | | | | | | |
| (1) Softening resistance | D | C | A | A | A | A |
| (2) Resistance to embrittlement | — | — | No cracking occurred | | | |
| Cold resistance | No breakage occurred | | | | | Broken |

As is seen from Table 8, CHC-1 easily softens and disintegrates in sour gasoline, but its sour gasoline resistance can be improved by mixing it with an epichlorohydrin/allyl glycidyl ether copolymer rubber. It is also appreciated from the table that no effect is produced when the proportion of allyl glycidyl ether in the mixture is less than 5 mole %, and the rubber composition has poor cold resistance if the proportion of ethylene oxide is less than 15 mole %.

EXAMPLE 6

Example 1 was repeated except that the ratio of epichlorohydrin to allyl glycidyl ether was changed to 80/20. The results are shown in Table 9.

TABLE 9

| | Run No. | | | | | |
|---|---|---|---|---|---|---|
| | 29 | 30 | 31 | 32 | 33 | 34 |
| | Comparison | Invention | | | | Comparison |
| Composition of the rubber mixture (mole %) | | | | | | |
| Epichlorohydrin | 56 | 59 | 62 | 68 | 71 | 74 |
| Ethylene oxide | 40 | 35 | 30 | 20 | 15 | 10 |
| Allyl glycidyl ether | 4 | 6 | 8 | 12 | 14 | 16 |
| Sour gasoline resistance | | | | | | |
| (1) Softening resistance | D | B | A | A | A | A |
| (2) Resistance to embrittlement | — | No cracking occurred | | | | Cracking occurred |
| Cold resistance | No breakage occurred | | | | | Broken |

As is seen from Table 9, when the proportion of allyl glycidyl ether in the rubber mixture is less than 5 mole %, the vulcanizate easily softens and disintegrates in sour gasoline. When the proportion of allyl glycidyl ether exceeds 15 mole %, the vulcanizate shows good sour gasoline resistance but loses rubbery elasticity; in the embrittlement resistance test, this vulcanizate develops cracks and is defective for practical application.

EXAMPLE 7

A copolymer rubber composed of epichlorohydrin (85 mole %) and allyl glycidyl ether (15 mole %) and CHC-1 were mixed in a ratio of 40:60 so that the rubber mixture obtained contained 64 mole % of epichlorohydrin, 30 mole % of ethylene oxide and 6 mole % of allyl glycidyl ether, and vulcanized in accordance with each of the compounding recipes shown in Table 10. Each of the vulcanizates was tested in the same way as in Example 1. The results are shown in Table 11.

TABLE 10

| | Run No. | | | |
|---|---|---|---|---|
| | 35 | 36 | 37 | 38 |
| Epichlorohydrin-type rubber mixture | 100 | 100 | 100 | 100 |
| Stearic acid | 1 | 1 | 1 | 1 |
| FEF carbon black | 40 | 40 | 40 | 40 |
| Red lead | 7 | — | 5 | 5 |
| Magnesium oxide | — | 5 | — | — |
| 2-Mercaptoimidazoline | 1.2 | — | 0.3 | 0.3 |
| Trithiocyanuric acid | — | 1.0 | — | — |
| Sulfur | — | — | 0.8 | 1.6 |
| 1,3-Diphenyl guanidine | — | — | 0.5 | 0.5 |
| Benzothiazyl disulfide | — | — | 1.5 | 1.5 |
| Nickel dibutyldithiocarbamate | 1 | 1 | 1 | 1 |

TABLE 11

| | Run No. | | | |
|---|---|---|---|---|
| | 35 | 36 | 37 | 38 |
| | Invention | | Comparison | |
| Sour gasoline resistance | | | | |
| (1) Softening resistance | A | A | C | C |
| (2) Resistance to embrittlement | No cracking occurred | | — | — |

TABLE 11-continued

| | Run No. | | | |
|---|---|---|---|---|
| | 35 | 36 | 37 | 38 |
| | Invention | | Comparison | |
| Cold resistance | No breakage occurred | | | |

It is seen from Tables 9 to 11 that the vulcanizates obtained by vulcanization utilizing the chlorine atom of epichlorohydrin (i.e., the vulcanizate obtained by using 2-mercaptoimidazoline or trithiocyanuric acid as a vulcanizing agent) exhibit superior sour gasoline resistance, but that the sulfur-vulcanized products obtained by vulcanization utilizing the unsaturated bond of allyl glycidyl ether have markedly poor resistance to sour gasoline.

What we claim is:

1. A method of preventing deterioration of vulcanized rubber products which come into contact with sour gasoline which comprises forming said product from a vulcanizable rubber composition comprising
   (1) 100 parts by weight of a rubber selected from the group consisting of (A) a terpolymer rubber composed of 35 to 80 mole % of epichlorohydrin, 15 to 50 mole % of ethylene oxide and 5 to 15 mole % of an unsaturated epoxide, and (B) a rubber mixture prepared by mixing an epichlorohydrin-ethylene oxide copolymer rubber with an epichlorohydrin-unsaturated epoxide copolymer rubber so that the mixture will contain 35 to 80 mole % of epichlorohydrin, 15 to 50 mole % of ethylene oxide and 5 to 15 mole % of an unsaturated epoxide;
   (2) 0.2 to 10 parts by weight of a non-sulfur vulcanizing agent selected from the group consisting of 2-mercaptoimidazolines, 2-mercaptopyrimidines, trithiocyanuric acid and trithiocyanuric acid derivatives; and
   (3) 0 to 10 parts by weight of a vulcanization aid and allowing said product to come into contact with sour gasoline.

2. The method of claim 1 wherein the rubber component (1) is the terpolymer rubber (A).

3. The method of claim 1 wherein the rubber component (1) is the rubber mixture (B).

4. The method of claim 2 wherein the unsaturated epoxide constituting the terpolymer rubber (A) is selected from the group consisting of allyl glycidyl ether, glycidyl methacrylate, glycidyl acrylate and butadiene monoxide.

5. The method of claim 3 wherein the unsaturated epoxide constituting the epichlorohydrin-unsaturated epoxide copolymer rubber in the rubber mixture (B) is selected from the group consisting of allyl glycidyl ether, glycidyl acrylate, glycidyl methacrylate and butadiene monoxide.

6. The method of claim 3 wherein the epichlorohydrin-ethylene oxide copolymer rubber in the rubber mixture (B) is composed of 30 to 70 mole % of epichlorohydrin and 70 to 30 mole % of ethylene oxide.

7. The method of claim 3 wherein the epichlorohydrin-unsaturated epoxide copolymer rubber in the rubber mixture (B) is composed of 80 to 90 mole % of epichlorohydrin and 20 to 10 mole % of the unsaturated epoxide.

8. The method of claim 2 wherein the terpolymer rubber (A) is composed of 48 to 74 mole % of epichlorohydrin, 20 to 40 mole % of ethylene oxide and 6 to 12 mole % of the unsaturated epoxide.

9. The method of claim 1 wherein the non-sulfur vulcanizing agent is selected from the group consisting of 2-mercaptoimidazolines and 2-mercaptopyrimidines.

10. The method of claim 1 wherein the non-sulfur vulcanizing agent is selected from the group consisting of trithiocyanuric acid and its derivatives.

11. The method of claim 1 wherein the vulcanization aid is present in an amount up to 10 parts by weight per 100 parts by weight of rubber and is a metal compound selected from the group consisting of aromatic carboxylic acid salts, saturated aliphatic carboxylic acid salts, carbonates, phosphites, silicates and oxides of metals of Groups IIA, IIB and IVA of the periodic table.

12. The method of claim 11 wherein the non-sulfur vulcanizing agent is 2-mercaptoimidazoline and the vulcanization aid is red lead.

13. The method of claim 11 wherein the non-sulfur vulcanizing agent is trithiocyanuric acid, and the vulcanization aid is magnesium oxide or a mixture of magnesium oxide and calcium carbonate.

14. The method of claim 1 in which the rubber product is a fuel system hose adapted to be connected to an internal combustion engine and the sour gasoline is formed from gasoline in said internal combustion engine.

15. The method of claim 1 in which the rubber product is a diaphragm or packing adapted to be connected to an internal combustion engine and the sour gasoline is formed from gasoline in said internal combustion engine.

* * * * *